United States Patent [19]

Gorman et al.

[11] Patent Number: 5,904,793

[45] Date of Patent: May 18, 1999

[54] METHOD AND EQUIPMENT FOR RAPID MANUFACTURE OF LOOP MATERIAL

[75] Inventors: Michael R. Gorman, Lake Elmo; Nedlin B. Johnson, Minneapolis; Dennis L. Becker, Vadnais Heights; Donald W. Folske, Oakdale, all of Minn.

[73] Assignee: Minnesota Mining and Manufacturing Company, St. Paul, Minn.

[21] Appl. No.: 08/698,282

[22] Filed: Aug. 14, 1996

[51] Int. Cl.[6] ................................................ B65H 37/04
[52] U.S. Cl. ......................... 156/178; 156/199; 156/200; 156/285; 156/382; 156/462
[58] Field of Search .................... 156/285, 382, 156/199, 178, 436, 200, 462

[56] References Cited

U.S. PATENT DOCUMENTS

| | | | |
|---|---|---|---|
| 3,182,346 | 5/1965 | Winston | 15/209 |
| 3,723,213 | 3/1973 | Hoey | 156/72 |
| 3,801,245 | 4/1974 | Erb | 425/174.4 |
| 3,854,861 | 12/1974 | Worrall | 425/504 |
| 3,867,243 | 2/1975 | Stoller | 161/65 |
| 3,892,613 | 7/1975 | McDonald et al. | 156/210 |
| 4,310,375 | 1/1982 | Seki | 156/462 |
| 4,609,581 | 9/1986 | Ott | 428/100 |
| 4,761,318 | 8/1988 | Ott et al. | 428/85 |
| 4,770,917 | 9/1988 | Tochacek et al. | 428/95 |
| 5,032,122 | 7/1991 | Noel et al. | 604/391 |
| 5,188,265 | 2/1993 | Capy | 223/32 |
| 5,254,194 | 10/1993 | Ott et al. | 156/176 |
| 5,256,231 | 10/1993 | Gorman et al. | 156/178 |
| 5,326,612 | 7/1994 | Goulait | 428/100 |
| 5,380,313 | 1/1995 | Goulait et al. | 604/391 |
| 5,407,439 | 4/1995 | Goulait | 604/391 |
| 5,419,796 | 5/1995 | Miller | 156/207 |
| 5,614,281 | 3/1997 | Jackson et al. | 428/100 |

FOREIGN PATENT DOCUMENTS

| | | |
|---|---|---|
| 40 16 348 C2 | 11/1991 | Germany . |
| 7-213554 | 8/1995 | Japan . |
| WO 95/33390 | 12/1995 | WIPO . |

*Primary Examiner*—Francis J. Lorin
*Attorney, Agent, or Firm*—William L. Huebsch

[57] ABSTRACT

A method for forming a sheet of loop material in which a sheet of fibers is passed between a first cylindrical forming member having sockets and a second cylindrical forming member having mating posts to generally conform the sheet of fibers to the peripheral surface of the first forming member and retain it there for a distance after which molten thermoplastic material is bonded to it to form a backing layer. Arcuate portions of the sheet of fibers that were in the sockets then projecting from the backing. The formed sheet of fibers is retained along the peripheral surface of the first forming member for said distance by drawing air through those air passageways in the bottoms of the sockets. The first forming member can be heated, and a source of heated air can be supplied to restrict cooling of the first forming member.

25 Claims, 5 Drawing Sheets

METHOD AND EQUIPMENT FOR RAPID MANUFACTURE OF LOOP MATERIAL

TECHNICAL FIELD

The present invention relates to methods and equipment for making sheets of loop materials adapted to be cut into pieces to form the loop portions for fasteners of the type including releasably engageable hook and loop portions that can be used on garments such as disposable diapers.

BACKGROUND OF THE INVENTION

Many sheets of loop materials are known that are adapted to be cut into pieces to form the loop portions for fasteners of the type comprising releasably engageable hook and loop portions. Such sheets of loop materials typically comprise a backing and a multiplicity of loops formed from longitudinally oriented polymeric fibers bonded to or anchored in the backing and projecting from a front surface of the backing so that they may be releasably engaged with the hooks on the hook portion of such a fastener, and can be made by many methods including conventional weaving, or knitting techniques. Sheets of loop materials in which the loops are stitched into the backing are described in U.S. Pat. Nos. 4,609,581 and 4,770,917. While the loop fastener portions made from many such sheets of loop materials work well with many different hook fastener portions, many of the processes by which the sheets of loop material are made are more expensive than may be desired, particularly when the loop fastener portions are intended for a limited amount of use, such as to attach a disposable diaper, brief or garment to a person.

U.S. Pat. No. 5,256,231 (Gorman et al, the content whereof is incorporated herein by reference) discloses a sheet of loop material and a method and equipment for making it that provide effective loop fastener portions for such fasteners while being very inexpensive to manufacture either in a form intended for a limited amount of use, such as to releasably attach a disposable diaper or other disposable garment to a person, or in a form intended to be used a larger number of times. That sheet of loop material includes a backing comprising a thermoplastic backing layer with generally uniform morphology, and a sheet of longitudinally oriented fibers having generally non-deformed anchor portions bonded or fused in the thermoplastic backing layer at spaced bonding locations, and arcuate portions projecting from a front surface of the backing between the bonding locations; and is made by forming a sheet of longitudinally oriented polymeric fibers so that the sheet of fibers has arcuate portions projecting in the same direction from spaced anchor portions of the sheet of fibers, and then forming at least a portion of a backing around the spaced anchor portions of the sheet of fibers by extruding thermoplastic material onto the anchor portions of the sheet of fibers so that the arcuate portions of the sheet of fibers project from a front surface of the newly formed backing.

Such forming of the sheet of fibers is done by providing first and second generally cylindrical corrugating or forming members each including a plurality of uniformly spaced ridges defining its periphery, mounting the corrugating members in axially parallel relationship with portions of the ridges of the corrugating members in mesh with each other, rotating at least one of the corrugating members, feeding the sheet of fibers between the meshed portions of the ridges of the rotating corrugating members to generally conform the sheet of fibers to the periphery of the first corrugating member, thereby forming the arcuate portions of the sheet of fibers in spaces between the ridges of the first corrugating member and the anchor portions of the sheet of fibers along outer surfaces of the ridges of the first corrugating member, and retaining the formed sheet of fibers along the periphery of the first corrugating member after it has moved past the meshing portions of the ridges. At least a portion of the backing (or the entire backing) is then formed around the anchor portions of the sheet of fibers by extruding the molten thermoplastic material onto the anchor portions of the sheet of fibers while those anchor portions are on the end surfaces of the ridges on the first corrugating member.

U.S. Pat. No. 5,256,231 (Gorman et al) discloses that the ridges of the corrugating members can be elongate and generally parallel so that the bonding locations are also elongate and generally parallel and are continuous in one direction across the front surface of the backing so that continuous rows of the arcuate portions extend across the backing of the sheet of loop material; or alternately the ridges can be elongate, generally parallel, and in a regular pattern of discontinuous lengths so that the parallel bonding locations are also in a regular pattern of discontinuous lengths to form a regular pattern of discontinuous rows of the arcuate portions of the sheet of fibers along the front surface of the backing. Also, U.S. Pat. No. 5,256,231 (Gorman et al) contemplated that the ridges of the first corrugating member could form interlocking closed patterns (e.g., in the shape of circles, diamonds, octagons, letters, numbers, etc.) to form corresponding patterns for the arcuate portions of the fibers along the front surface of the backing, in which case the second corrugating member would be formed with post like ridges to press the sheet of fibers into the centers of the closed patterns.

As contemplated, this form of the corrugating or forming members can be used to form suitable loop materials when used as disclosed in U.S. Pat. No. 5,256,231. Some difficulties arise, however, when that equipment is run at higher speeds as is desired for production equipment, particularly when the sheet of fibers being fed into the equipment is a relatively low cost non woven sheet of cut fibers in which the fibers are not bonded together as is produced by a carding machine or off of a spunbond process in which the fibers are not consolidated. At those higher speeds difficulties have been found in maintaining the desired shape of a formed sheet of such fibers while it is retained along the periphery of the first forming member after it has moved past the meshing portions of the ridges and before the molten thermoplastic material is extruded onto its anchor portions. Also, unbonded webs can tend to loose fibers during the process.

DISCLOSURE OF THE INVENTION

The present invention provides improvements in the method and equipment contemplated in U.S. Pat. No. 5,256,231 (Gorman et al) for forming interlocking closed patterns (e.g., in the shape of circles, diamonds, hexagons, octagons, rectangles, letters, numbers, etc.) for the arcuate portions of fibers along the front surface of a backing that facilitate its use at the high speeds desired for production equipment (e.g., preferably at least 0.8 meters per second).

According to the present invention there is provided a method for forming a sheet of loop material adapted to be cut into pieces to form loop portions for fasteners of the type having releasably engageable hook and loop portions, which method, as contemplated in U.S. Pat. No. 5,256,231 (Gorman et al) includes the steps of:

providing an elongate sheet of fibers;

forming the sheet of fibers to have arcuate portions projecting in the same direction from spaced anchor portions of the sheet of fibers, said forming step comprising the steps of:

provi­ding first and second generally cylindrical forming members each having an axis, the peripheral surface of said first forming member being defined by a lattice surface on intersecting ridges, and a multiplicity of recessed surfaces defining sockets in a predetermined pattern recessed from said lattice surface, and said second forming member including a multiplicity of posts radially projecting in said predetermined pattern and having distal end portions adapted to project into said sockets in meshing relationship with the sheet of fibers therebetween;

mounting the forming members in axially parallel relationship with some of the posts in meshing relationship with some of the sockets;

rotating the forming members; and feeding the sheet of fibers longitudinally between the meshed portions of the posts and recessed surfaces to generally conform the sheet of fibers to the periphery of the first forming member and form the arcuate portions of the fibers in the spaces between the distal ends of the posts and the recessed surfaces defining the sockets and the anchor portions of the fibers along the lattice surface;

retaining the formed sheet of fibers along the peripheral surface of the first forming member for a predetermined distance after movement past the meshing portions of the posts and recessed surfaces;

extruding molten thermoplastic material onto the anchor portions to form at least a portion of a backing with generally uniform morphology around the spaced anchor portions of the sheet of fibers with the arcuate portions of the sheet of fibers projecting from a front surface of the backing; and cooling and solidifying the layer of thermoplastic material.

Additionally, in order to obtain high rates of production for the loop material, in the present invention, the lattice surface and the recessed surfaces defining the sockets are shaped so that they will not engage and pull fibers from the sheet of fibers, the first forming member has surfaces defining air passageways through the recessed surfaces within the sockets, and the formed sheet of fibers is retained along the peripheral surface of the first forming member for a predetermined distance after movement past the meshing portions of the posts and recessed surfaces primarily by drawing air through those air passageways.

To facilitate slower rates of production (e.g., about 0.3 meters per second), the first forming member can be heated so that it will not act as a heat sink and solidify the thermoplastic material before the extruded thermoplastic material and the anchor portions of the fibers are fully bonded together; and a source of heated air substantially above ambient temperature can be supplied to be drawn into the air passageways so that the fibers can be retained in their desired shape and the air being drawn into the air passageways will not cool the first forming member below its desired temperature.

At higher production speeds, thermoplastic material will have less time in contact with the first forming member so that it will have less heat sink effect, however, heating of the first forming member and the air being drawn into the air passageways should still be desirable.

Preferably, the lattice surface on the intersecting ridges should have widths of at least 0.06 centimeter or 0.025 inch and should be disposed to define an array of inlet openings to the sockets (e.g., hexagonal, rectangular, diamond shaped, or circular openings) with the inlet openings to the sockets having a width in the range of about 0.25 to 1.3 centimeters (0.1 to 0.5 inch).

BRIEF DESCRIPTION OF DRAWING

The present invention will be further described with reference to the accompanying drawing wherein like reference numerals refer to like parts in the several views, and wherein.

DETAILED DESCRIPTION

Figure 1:
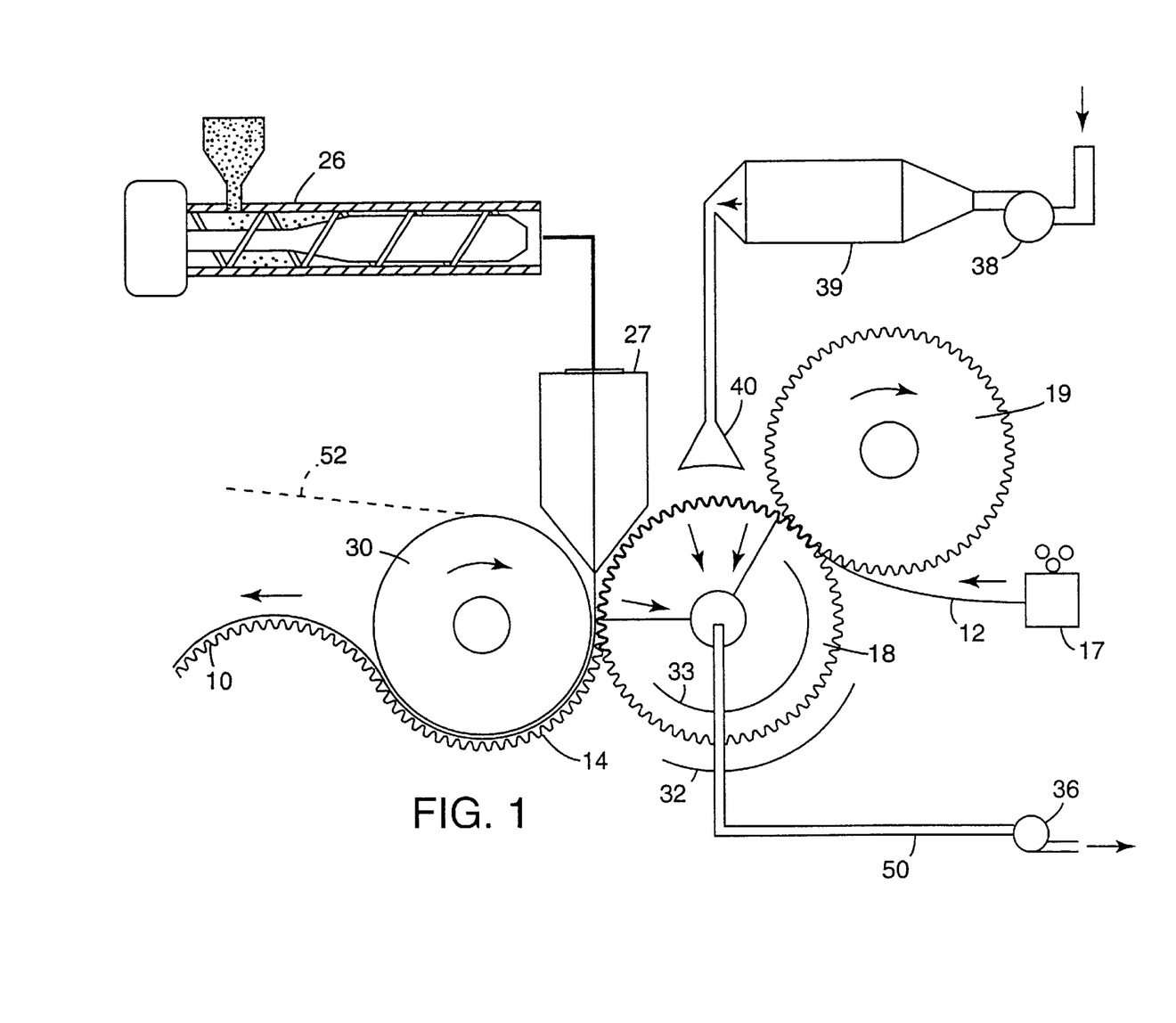
FIG. 1 is a schematic view illustrating a first embodiment of a method and equipment according to the present invention for making a sheet of loop material.

FIG. 1 schematically illustrates a first embodiment of a method and equipment according to the present intention for forming a sheet of loop material 10 (see FIG. 5) adapted to be cut into pieces to form loop portions for fasteners of the type having releasably engageable hook and loop portions. As illustrated in FIG. 1, the method generally comprises forming longitudinally oriented polymeric fibers into an elongate sheet 12 of fibers, forming the sheet 12 of fibers so that it has arcuate portions 14 projecting in the same direction from anchor portions 15 of the sheet 12 of fibers, and bonding the spaced anchor portions 15 of the sheet of fibers 12 in a backing layer 16 with the arcuate portions 14 of the sheet 12 of fibers projecting from the front surface of the backing layer 16.

Figure 2:
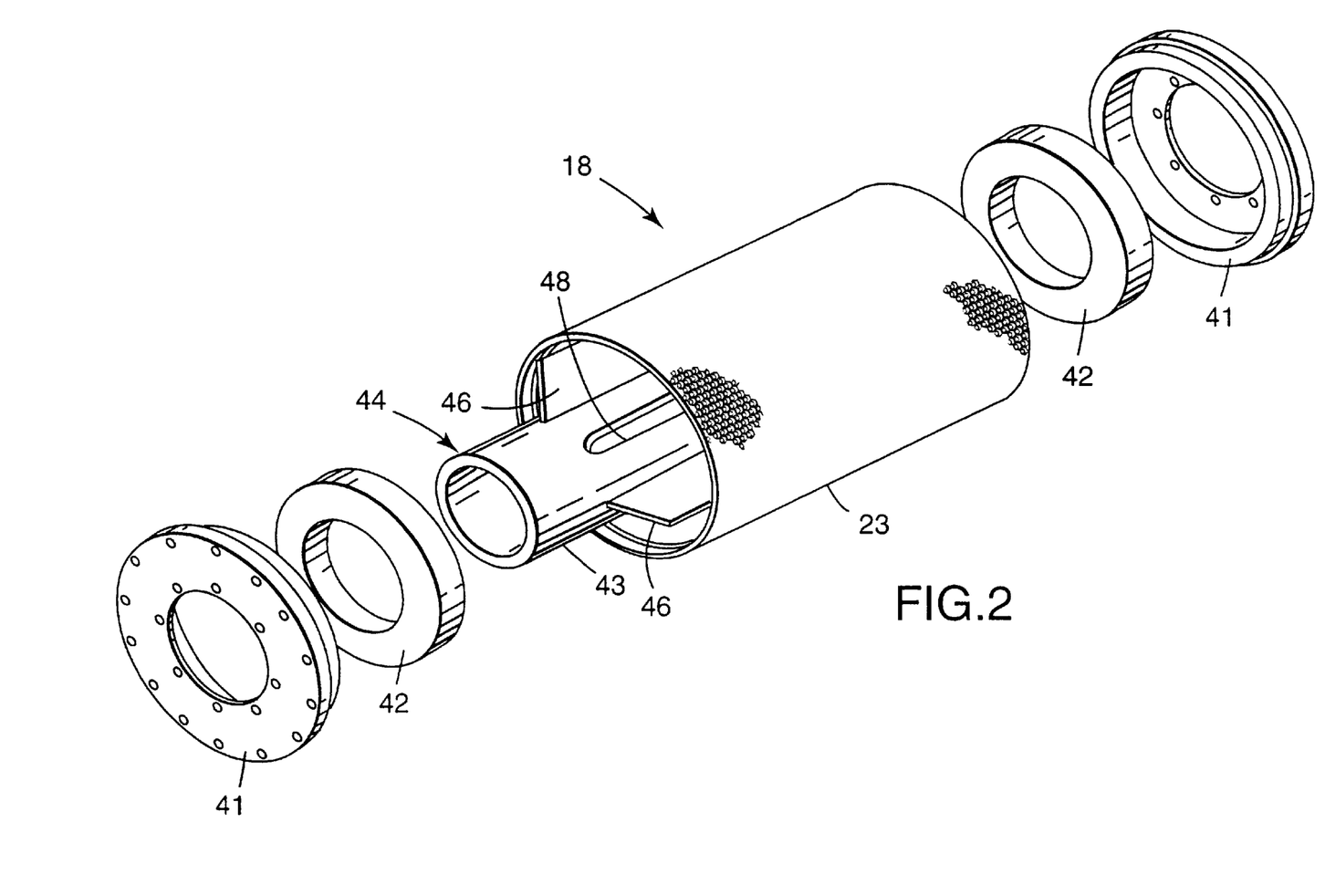
FIG. 2 is an exploded perspective view of a first forming member used in the method and equipment of FIG. 1.
Figure 3:
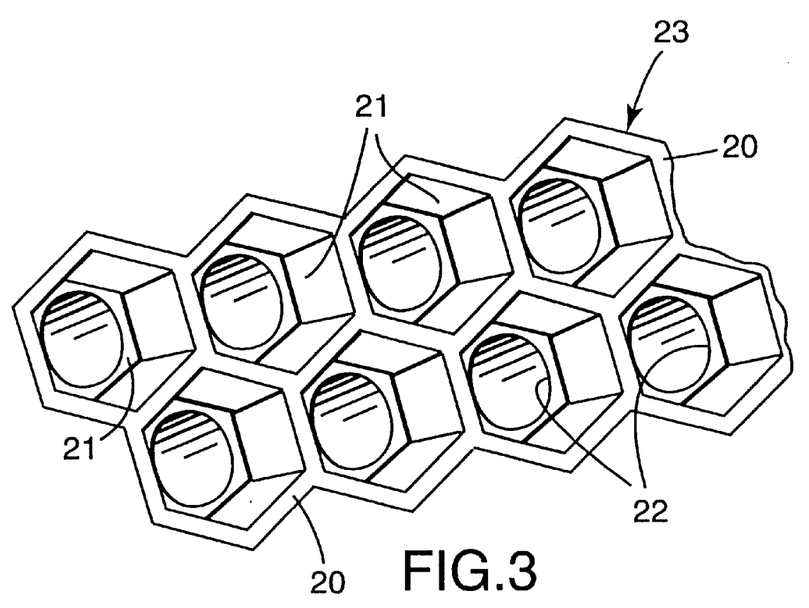
FIG. 3 is an enlarged fragmentary view of the peripheral surface of the first forming member used in the method and equipment of FIG. 1.
Figure 4:
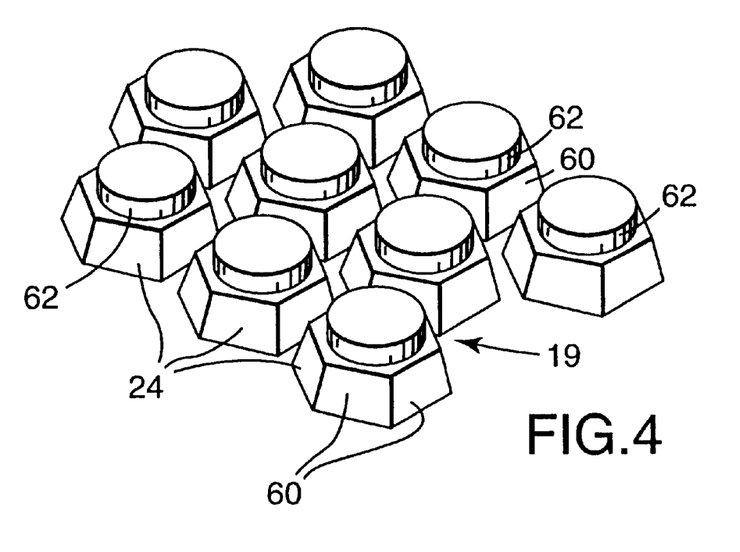
FIG. 4 is an enlarged fragmentary view of the peripheral surface of a second forming member used in the method and equipment of FIG. 1.

The elongate sheet 12 of fibers can be formed from cut polymeric fibers using a carding machine 17. The sheet 12 of fibers is then formed by providing first and second generally cylindrical forming members or rollers 18 and 19. As is best seen in FIGS. 2 and 3, the first forming roller 18 includes an outer shell 23 having a peripheral surface (FIG. 3 illustrates a small segment of the peripheral surface of the first forming roller 18) including a lattice surface 20 on intersecting ridges, a multiplicity of recessed surfaces defining sockets 21 in a predetermined pattern recessed from the lattice surface 20, and surfaces defining air passageways 22 generally centrally through the recessed surfaces within the sockets 21 that extend to the inner surface of the shell 23. The second forming roller 19 (FIG. 4 illustrates a small segment of the peripheral surface of the second forming roller 19) includes a multiplicity of posts 24 radially projecting in the same predetermined pattern in which the sockets 21 are disposed and having distal end portions adapted to project into the sockets 21 in meshing relationship with the sheet 12 of fibers therebetween. The forming rollers 18 and 19 are mounted in axially parallel relationship with some of the posts 24 in meshing relationship with some of the sockets 21 in the manner of gear teeth. The forming rollers 18 and 19 are rotated and the sheet 12 of fibers is fed longitudinally between the meshed portions of the posts 24 and sockets 21 to generally conform the sheet 12 of fibers to the periphery of the first forming roller 18, thereby forming the arcuate portions 14 of the sheet 12 of fibers in the spaces between the distal ends of the posts 24 and the recessed surfaces defining the sockets 21 and the anchor portions 15 of the sheet 12 of fibers along the lattice surface 20. The formed sheet 12 of fibers is then retained along the peripheral surface of the first forming roller 18 for a predetermined distance after movement past the meshing portions of the posts 24 and sockets 21 primarily by drawing air into the first forming roller 18 through the air passageways 22. Molten thermoplastic material melted in an extruder 26 is extruded through a slot die 27 onto the anchor portions 15 of the sheet 12 of fibers along that predetermined distance to form at least a portion of the backing layer 16 around the anchor portions 15 of the sheet 12 of fibers with the arcuate portions 14 of the sheet 12 of fibers projecting from a front surface of the backing layer 16. The thermoplastic material in the backing layer 16 is then cooled and solidified by passing it around the surface of a cooling roll 30. The extruder could be adapted so that the extrudate is multi layer with tie layer resins known to those skilled in the art such as EAA, EVA, PE, etc., or an elastomer layer with polypropylene skins.

To insure that the extruded thermoplastic material will properly adhere to the anchor portions 15 of the sheet 12 of fibers, The peripheral shell 23 of the first forming roller 18 is heated (e.g., to about 127 degrees Centigrade or 260 degrees Fahrenheit) by fixed radiant heaters 32 and 33 on its opposite sides, so that the peripheral shell 23 will not act as a heat sink which solidifies the thermoplastic material before the extruded thermoplastic material and the anchor portions of the fibers are fully bonded together. The inner surface of the shell 23 has a black oxide coating to facilitate heating by the heater 33 which is the primary heat source. A chrome coating on the peripheral surface of the forming roller, that aids release of the formed sheet of fibers, is resistive to heating by the radiant heater 32. Air heated to a temperature substantially above ambient temperature (e.g., 104 degrees Centigrade or 220 degrees Fahrenheit) is supplied along the peripheral surface of the shell 23 between the second forming roller 19 and the cooling roller 30 to prevent the first forming roller 18 from being cooled excessively by air being drawn into the air passageways 22 to help retain the formed sheet 12 of fibers along that peripheral surface. That heated air is supplied along that peripheral surface by a heater fan 38 blowing the air through a heater 39 and out a nozzle 40 spaced closely above it so that heated air will be drawn into the air passageways 22. The source of air for the heater fan 38 can be only the atmosphere as illustrated, or the heated air which is pulled through the air passageway 22 into the first forming roller 18 by a suction fan 36 can be recycled by means not shown to provide at least a portion or all of the supply air for the heater fan 38. Also, the peripheral shell 23 could be heated by means other than the fixed heaters 32 and 33, such as induction heating.

As can be seen in FIG. 2, the first forming roller includes the outer shell 23, circular end plates 41 attached to the opposite ends of the shell 23, and bearings 42 that afford rotation of the shell 23 and circular end plates 41 on a hollow cylindrical shaft 43 included in a fixed central air handling portion 44. The fixed central air handling portion 44 includes means for allowing air to be pulled through the air passageways 22 along a portion of the shell 23 moving from the second forming roller 19 to the cooling roller 30, and for restricting movement of air into the air passageways 22 along the rest of the shell 23. That means includes two radially projecting axially extending baffles 46 mounted on the shaft 43 which extend from the shaft 43 to the inner surface of the shell 23, one extending toward the second forming roller 19 and the other extending toward the cooling roller 30, and an axially extending air inlet slot 48 through the shaft 43 between the baffles 46. Air can be pulled by the suction fan 36 through the air passageways 22 between the baffles 46 and through the slot 48 into the opening at the center of the shaft 43 which is connected by a hose 50 to the inlet to the suction fan 36. The means in the fixed central air handling portion 44 for restricting movement of air into the air passageways 22 along the rest of the shell 23 comprises the baffles 46 which separate those air passageways from the slot 48.

As is illustrated in FIG. 3, the sockets 21 have hexagonal inlet openings and are disposed in an array so that the lattice surface 20 has a uniform width between the sockets 21. It has been found that to get good bonding between the fibers and the backing layer 16 along that lattice surface 20, the lattice surface 20 should have a width of at least 0.025 inch or 0.063 centimeter between adjacent sockets 21, with a width of at least about 0.028 inch or 0.071 centimeter between adjacent sockets 21 being preferred. As illustrated in FIG. 3, the sockets are defined by planar surfaces disposed in hexagonal patterns, which planar surfaces are tapered inwardly toward the inner portions of the sockets 21, and the air passageways 22 are defined by a cylindrical surface. To afford a large volume of air movement toward the suction fan 36 to hold the formed sheet 12 of fibers in the sockets 21, the air passageway 22 have a cross sectional area that is large compared to the area of the sockets 21 in the plane of the lattice surface 20, and could be almost as large as that inlet area. The surfaces defining the sockets 21 are smooth and are chrome plated to facilitate release of a formed sheet 12 of fibers from within the sockets.

As illustrated in FIG. 4, the posts 24 have hexagonal tapered side surfaces 60 around their bases and cylindrical surfaces 62 around their distal ends that are adapted to project into the sockets 21 with the sheet 12 of fibers therebetween. The posts 24 are disposed in the same array as the sockets 21. The first and second forming members are biased together with air cylinders (not shown) so that the sheet 12 of fibers provides the spacing between the surfaces of the posts 24 and sockets as the sheet 12 of moves therebetween. Alternatively, a fixed gap could provide that spacing. The surfaces 60 and 62 of the posts 24 are also smooth and chrome plated to facilitate release from the formed sheet 12 of fibers.

Figure 5:
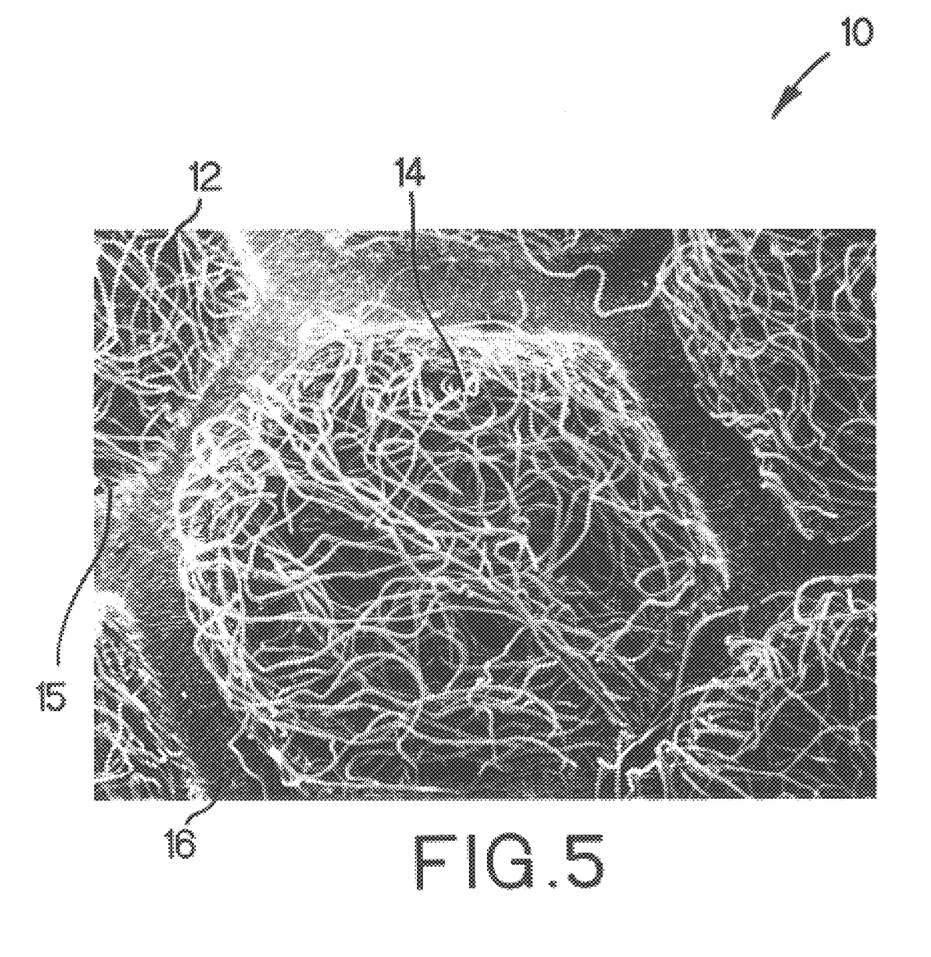
FIG. 5 is a photographs at 15 times magnification of a sheet of loop material made by the method and equipment of FIG. 1.

FIG. 5 is a photograph at 15 times magnification of a fragment of a sheet of loop material 10 according to the present invention that was made using the cavities 21 and posts 24 illustrated in FIGS. 3 and 4. The sheet of loop material 10 has arcuate portions 14 of the sheet 12 of fibers projecting in generally a hexagonal pattern in the same direction from anchor portions 15 of the sheet 12 of fibers, and spaced anchor portions 15 of the sheet of fibers 12 bonded in a backing layer 16 with the arcuate portions 14 of the sheet 12 of fibers projecting from the front surface of the backing layer 16.

As an example, a sheet of loop material according to the present invention was made using the method illustrated in FIG. 1. Cut 6 denier polypropylene fibers 4.76 centimeters (1.875 inches) long obtained under the commercial designation "6d, T-110 1⅞" from Hercules Inc., Covington, Ga. were formed, using the carding machine 17, into the longitudinal continuous sheet 12 of fibers which had a basis weight of 42 grams per square meter with the majority of the fibers (i.e. at least 90 percent) oriented in its longitudinal or machine direction. That sheet 12 of fibers was fed into the nip between the first and second forming rolls 18 and 19. The recessed surfaces defining the sockets and the posts 24 of the intermeshing forming rolls 18 and 19 were shaped to form along the length of the sheet 12 of fibers a honeycomb matrix of hexagonal pillowed projecting arcuate portions 14 of the sheet 12 of fibers, with each projecting arcuate portion 14 being hexagonal in shape around its periphery, about 5 mm wide, and 2 mm high, surrounded by an anchor portion 15 about 1 mm wide (see FIGS. 4 and 5). The formed sheet 12 of fibers had a basis weight of 42 grams per square meter. The formed sheet 12 of fibers adhered preferentially to the first forming roller 18 due to friction between the arcuate portions 14 of the sheet 12 of fibers that had been pressed into the sockets 21 by the posts 24, and the movement of air into the air passageways 22. The sockets 21 had very clean, bur free edges which offered little resistance to movement of the arcuate portions 14 out of them, thus making it necessary to draw air into the air passageways 22 to retain the arcuate portions in the sockets 21, while affording clean release of the carded unbonded low cohesion sheet 12 of fibers which could easily loose fibers if rough edges were present at the sockets 21. Polypropylene material commercially designated Shell SRD7-560 was extruded by the extruder 26 through the die 27 at a melt temperature of 508 degrees F. and onto the anchor portions 15 of the formed sheet 12 of fibers at the nip between the first forming roller 18 and the cooling roller 30 in an amount appropriate to form a thermoplastic backing layer 16 weighing 50 grams per square meter with anchor portions 15 of the formed sheet 12 of fibers embedded therein. The outer shell 23 of the first forming roller 18 was heated by the heaters 32 and 33 to an outer surface temperature of approximately 263 F. while running at a line speed of 60 fpm. Heating the outer surface of the first forming roller 18 was found necessary in order to securely bond the anchor portions 15 of the formed sheet 12 of fibers to the thermoplastic backing layer 16, with an outer surface temperature in the range of 260 to 268 degrees Fahrenheit or 127 to 131 degrees Centigrade being required under the conditions described above to get an adequate bond without melting the fibers in the arcuate portions 14 of the sheet 12 of fibers. The bond thus produced was uniform, translucent and film-like. In order to maintain that surface temperature while air was being drawn into the air passageways 22, air heated to about 104 degrees Centigrade or 220 degrees Fahrenheit was supplied at the surface of the first forming roll 18. The sheet of loop material 10 formed at the nip between the first forming roll 18 and the cooling roller 30 was then moved 200 degrees around the periphery of the cooling roller 30 which was at a temperature of about 32 degrees Centigrade or 90 degrees Fahrenheit to ensure adequate cooling of the thermoplastic backing layer 16. The resultant sheet of loop material 10 had soft, pillow like arcuate portions 14 due to the ability of air moving into the air passageways to hold the arcuate portions 14 of the formed sheet 12 of fibers away from the harsh heat of the molten thermoplastic material before it solidified. The finished sheet of loop material 10 was easily and firmly engaged by the hook material of the type described in U.S. Pat. No. 4,894,060 issued Jan. 16, 1990, (the content whereof is incorporated herein by reference).

A sheet of loop material was formed in the same manner described in the above example except that the suction fan 36 was shut off so that no air was drawn through the air passageways 22. The sheet of loop material formed was not acceptable because acceptable uniform pillow-like projecting arcuate portions of the sheet of fibers could not be made at speeds greater than 0.3 meters per second.

Loop material was formed in the same manner described in the above example, except that a 1.8 mil cast polypropylene film with a pre-printed pattern was fed around the cooling roll 30 along the path indicated by the dotted line 52 and became a portion of the backing layer 16 that was laminated by the extruded layer of thermoplastic material to the anchor portions 15 of the sheet 12 of fibers. The pre-printed pattern was found to be easily visible through the fibers.

It is anticipated that many other types of cut fibers could be used in the above example, particularly including cut bi-component fibers 4.76 centimeters (1.875 inches) long having a polyethylene sheath and a polypropylene core such as the fibers commercially designated 6d "T-425 1⅞" available from Hercules Corporation, Wilmington, Del. Such fibers used at about the same basis weight to form a sheet of loop material that had improved bond strength and affinity for certain hook materials.

The types and materials of the fibers that could be used in the sheet 12 of fibers, the basis weights for sheets 12 of fibers that could be used, and the material for the backing layer 16 are generally the same as those discussed in U.S. Pat. No. 5,256,231 (Gorman et al), the content whereof is incorporated herein by reference.

Figure 6:
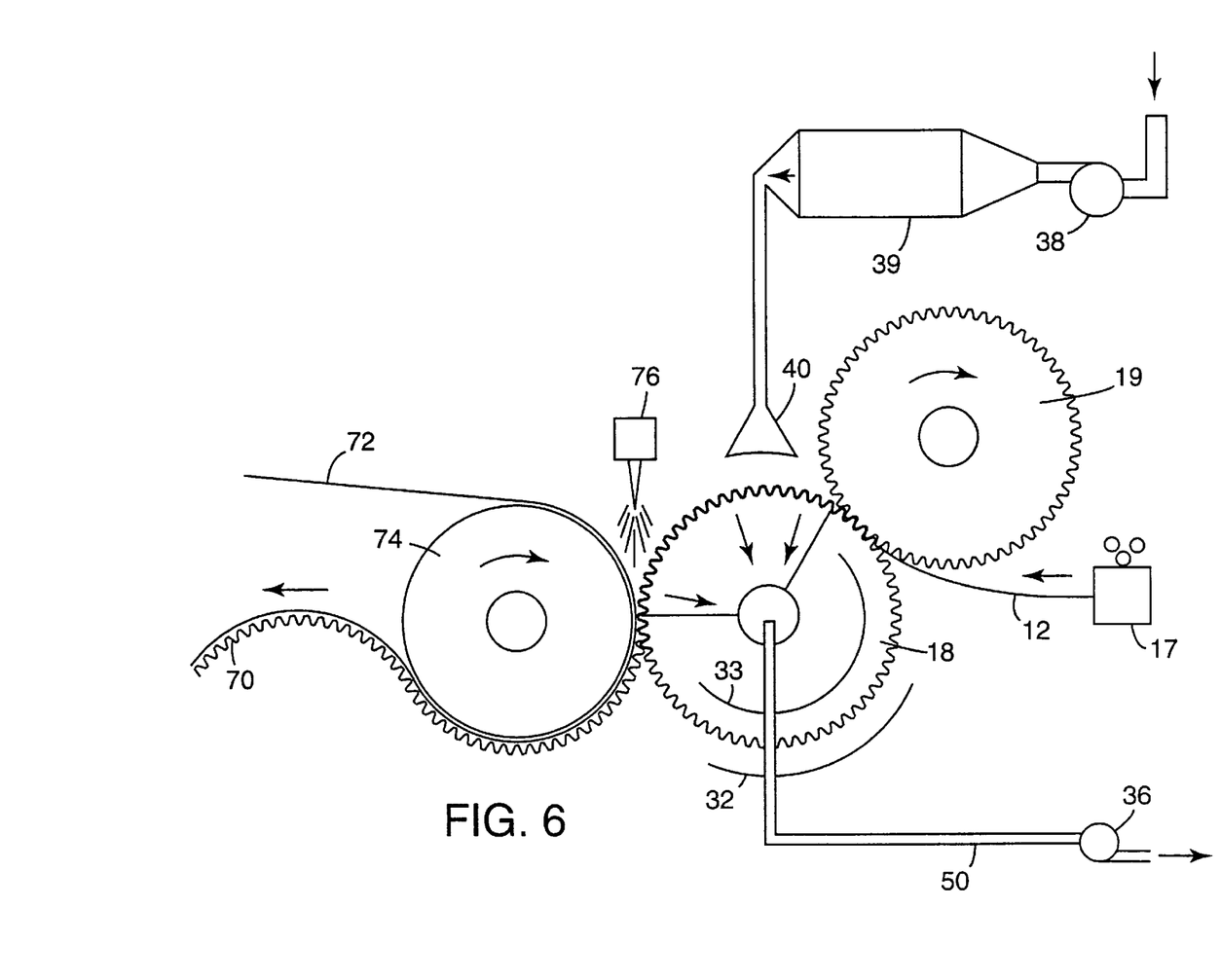
FIG. 6 is a schematic view illustrating a second embodiment of a method and equipment according to the present invention for making a sheet of loop material.

FIG. 6 illustrates a second embodiment of a method and equipment for making a loop material 70 in which the method and equipment for forming the sheet of fibers and carrying it on the surface of the first forming roller 18 is the same as that described above and is indicated by the same reference numeral, but in which there is illustrated a different means for attaching a layer of material 72 to the anchor portions of the sheet of 12 fibers to form at least a portion of a backing attached to the anchor portions of the sheet of fibers with the arcuate portions of the sheet of fibers projecting from a front surface of the backing. As illustrated, the layer of material 72, which could be a polymeric film, woven or non-woven layer of fibers, is attached to those anchor portions in a nip either by heat and pressure applied by a heated roller 74, or, alternatively, by spraying an adhesive, such as a hot melt adhesive, from a spray assembly 76 over the surface of the layer of material 72 to be attached to the anchor portions.

The present invention has now been described with reference to one embodiment thereof. It will be apparent to those skilled in the art that many changes can be made in the embodiment described without departing from the scope of the present invention. For example the first and second forming members could be made with axially extending ridges like the axially extending ridges 28 on the corrugating members or rollers 26 and 27 described in U.S. Pat. No. 5,256,231 (Gorman et al) with the air passageways opening into the recesses between the ridges and would help in high speed formation of sheet material of the type illustrated in U.S. Pat. No. 5,256,231. Also, a sheet of loop material having arcuate portions projecting from both sides of a backing could be formed by providing first and second forming rollers on both sides of the extruder die, and forming a sheet of fibers on each set of forming rollers so that the backing layer is extruded or otherwise attached onto the anchor portions of both sheets of fibers, in which case, if needed, cooling of the backing layer could be caused by air currents directed against its opposite sides. Thus the scope of the present invention should not be limited to the method and structures described in this application, but only by the method and structures described by the language of the claims and the equivalents thereof.

What is claimed is:

1. A method for forming a sheet of loop material adapted to be cut into pieces to form loop portions for fasteners of the type having releasably engageable hook and loop portions, said method comprising:

provic​ing an elongate sheet of fibers;

forming the sheet of fibers to have arcuate portions projecting in the same direction from spaced anchor portions of the sheet of fibers, said forming step comprising the steps of:

providing first and second generally cylindrical forming members each having an axis, the peripheral surface of said first forming member being defined by a lattice surface on intersecting ridges, a multiplicity of recessed surfaces defining sockets in a predetermined pattern recessed from said lattice surface, and surfaces defining air passageways through said recessed surfaces within said sockets, and said second forming member including a multiplicity of posts radially projecting in said predetermined pattern and having distal end portions adapted to project into said sockets in meshing relationship with the sheet of fibers therebetween;

mounting the corrugating members in axially parallel relationship with some of the posts in meshing relationship with some of the sockets;

rotating the forming members; and feeding the sheet of fibers longitudinally between the meshed portions of the posts and recessed surfaces to generally conform the sheet of fibers to the periphery of the first forming member and form the arcuate portions of the fibers in the spaces between the distal ends of the posts and the recessed surfaces defining the sockets and the anchor portions of the fibers along the lattice surface;

retaining the formed sheet of fibers along the peripheral surface of the first forming member for a predetermined distance after movement past the meshing portions of the posts and recessed surfaces primarily by drawing air through said air passageways; and attaching a layer of material to the anchor portions of the sheet of fibers to form at least a portion of a backing attached to the anchor portions with the arcuate portions of the sheet of fibers projecting from a front surface of the backing.

2. A method for forming a sheet of loop material according to claim 1 further including the steps of:

heating the first forming member to a temperature substantially above ambient temperature; and supplying a source of heated air substantially above ambient temperature to be drawn into said air passageways during said retaining step.

3. A method for forming a sheet of loop material according to claim 2 wherein the peripheral surface of said first forming member in contact with said formed sheet of fibers is heated to a temperature in the range of about 49 to 204 degrees Centigrade or 120 to 400 degrees Fahrenheit.

4. A method for forming a sheet of loop material according to claim 2 wherein said heated air drawn into said air passageways in said retaining step is heated to a temperature in the range of about 49 to 204 degrees Centigrade or 120 to 400 degrees Fahrenheit.

5. A method for forming a sheet of loop material according to claim 2 wherein said heated air drawn into said air passageways in said retaining step is recycled to provide at least a portion of said source of heated air.

6. A method according to claim 1 wherein said lattice surfaces are of generally uniform width of over 0.06 centimeter (0.025 inch) and are disposed to define hexagonal inlet openings to said sockets with said inlet openings to said sockets having a width in the range of about 0.25 to 1.3 centimeters (0.1 to 0.5 inch).

7. A method for forming a sheet of loop material according to claim 1 wherein said step of providing the elongate sheet of fibers comprises the step of carding cut fibers to provide a sheet of fibers having a basis weight in the range of 15 to 80 grams per square meter with over 50 percent of the fibers extending longitudinally of the sheet.

8. A method for forming a sheet of loop material according to claim 1 wherein said step of providing the elongate sheet of fibers comprises the step of carding cut fibers to provide a sheet of fibers having a basis weight in the range of 30 to 50 grams per square meter with over 90 percent of the fibers extending longitudinally of the sheet.

9. A method for forming a sheet of loop material according to claim 1 wherein said attaching step comprises extruding molten thermoplastic material onto the anchor portions to form at least a portion of a backing around the spaced anchor portions of the sheet of fibers with the arcuate portions of the sheet of fibers projecting from a front surface of the backing; and cooling and solidifying the layer of thermoplastic material, and said method further includes the step of positioning a surface of a sheet of backing material intended to be incorporated into the backing closely adjacent the spaced anchor portions, and wherein in said extruding step the molten thermoplastic material is extruded onto both the anchor portions of the fibers and onto the adjacent surface of the sheet of backing material, and said method includes the step of pressing the sheet of backing material and the anchor portions of the fibers into intimate contact with the molten thermoplastic material.

10. A method according to claim 9 further including the step of printing the sheet of backing material with graphics along one of its surfaces prior to said positioning step.

11. A method for forming a sheet of loop material according to claim 9 wherein said extruding step forms the entire backing.

12. A method for forming a sheet of loop material according to claim 9 wherein the thermoplastic material and the fibers comprise the same thermoplastic material, and said extruding step fuses the thermoplastic material extruded onto the anchor portions of sheet of fibers to the surface of the fibers.

13. A method for forming a sheet of loop material according to claim 9 further including providing a generally cylindrical cooling roll having an axis; and mounting the cooling roll in axially parallel relationship with the forming members with the periphery of the cooling roll closely spaced from and defining a nip with the periphery of the first forming member at the predetermined distance from the meshing portions of said forming members; and said extruding step extrudes the molten thermoplastic material onto the anchor portions of the fibers along the periphery of the first forming member adjacent the nip between the cooling roll and the first forming member.

14. A method for forming a sheet of loop material according to claim 13 wherein said method further includes the step of moving the sheet of loop material for a predetermined distance around the periphery of the cooling roll past the nip with the backing of the sheet of loop material in contact with the cooling roll to cool and solidify the backing.

15. A method for forming a sheet of loop material according to claim 13 wherein the molten thermoplastic material contacts the peripheral surface of the cooling roller so that the cooling roller forms a rear surface for the backing opposite the sheet of fibers.

16. A method for forming a sheet of loop material according to claim 13 wherein said method further includes feeding a sheet of backing material along the peripheral surface of the cooling roller so that the sheet of backing material moves through the nip, and the molten thermoplastic material contacts and adheres to a major surface of the sheet of backing material opposite the cooling roll to incorporate the sheet of backing material in the backing.

17. Equipment for forming a sheet of loop material adapted to be cut into pieces to form loop portions for fasteners of the type having releasably engageable hook and loop portions, said equipment comprising:

means for providing an elongate sheet of fibers;

means for forming the sheet of fibers to have arcuate portions projecting in the same direction from spaced anchor portions of the sheet of fibers, said means for forming comprising:

first and second generally cylindrical forming members each having an axis, the peripheral surface of said first forming member being defined by a lattice surface on intersecting ridges, a multiplicity of recessed surfaces defining sockets in a predetermined pattern recessed from said lattice surface, and surfaces defining air passageways through said recessed surfaces within said sockets, and said second forming member including a multiplicity of posts radially projecting in said predetermined pattern and having distal end portions adapted to project into said sockets in meshing relationship with the sheet of fibers therebetween;

means for mounting the corrugating members in axially parallel relationship with some of the posts in meshing relationship with some of the sockets;

means for rotating the forming members; and means for feeding the sheet of fibers longitudinally between the meshed portions of the posts and recessed surfaces to generally conform the sheet of fibers to the periphery of the first forming member and form the arcuate portions of the fibers in the spaces between the distal ends of the posts and the recessed surfaces defining the sockets and the anchor portions of the fibers along the lattice surface;

means for retaining the formed sheet of fibers along the peripheral surface of the first forming member for a predetermined distance after movement past the meshing portions of the posts and recessed surfaces comprising means for drawing air through said air passageways; and means for attaching a layer of material to the anchor portions of the sheet of fibers to form at least a portion of a backing attached to the spaced anchor portions fibers with the arcuate portions of the sheet of fibers projecting from a front surface of the backing.

18. Equipment for forming a sheet of loop material according to claim 17 further including:

means for heating the first forming member to a temperature substantially above ambient temperature; and means for supplying a source of heated air substantially above ambient temperature to be drawn into said air passageways by said means for retaining to restrict cooling of said first forming member.

19. Equipment according to claim 17 wherein said lattice surfaces are of generally uniform width in the range of about 0.06 to 0.10 centimeter (0.025 to 0.04 inch) and are disposed to define inlet openings to said sockets having a width in the range of about 0.25 to 1.3 centimeters (0.1 to 0.5 inch).

20. Equipment according to claim 17 wherein said means for providing the elongate sheet of fibers comprises a carding machine for carding cut fibers to provide said sheet of fibers.

21. Equipment according to claim 17 wherein said means for providing the elongate sheet of fibers comprises a spunbond machine for producing fibers from resin to provide said sheet of fibers.

22. Equipment according to claim 17 further including a generally cylindrical cooling roll having an axis; and means for mounting the cooling roll in axially parallel relationship with the forming members with the periphery of the cooling roll closely spaced from and defining a nip with the periphery of the first forming member at the predetermined distance from the meshing portions of said forming members; and said means for attaching includes means for extruding molten thermoplastic material onto the anchor portions of the fibers along the periphery of the first forming member adjacent the nip between the cooling roll and the first forming member.

23. A method for forming a sheet of loop material adapted to be cut into pieces to form loop portions for fasteners of the type having releasably engageable hook and loop portions, said method comprising:

providing an elongate sheet of fibers;

forming the sheet of fibers to have arcuate portions projecting in the same direction from spaced anchor portions of the sheet of fibers, said forming step comprising the steps of:

providing first and second generally cylindrical forming members each having an axis, the peripheral surface of said first forming member being defined by surfaces on ridges, recessed surfaces defining recesses and surfaces defining air passageways through said recessed surfaces, and said second forming member including a multiplicity of projections radially projecting in said predetermined pattern and having distal end portions adapted to project into said recesses in meshing relationship with the sheet of fibers therebetween;

mounting the corrugating members in axially parallel relationship with some of the projections in meshing relationship with some of the recesses;

rotating the forming members; and feeding the sheet of fibers longitudinally between the meshed portions of the projections and recessed surfaces to generally conform the sheet of fibers to the periphery of the first forming member and form the arcuate portions of the fibers in the spaces between the distal ends of the projections and the recessed surfaces defining the sockets and the anchor portions of the fibers along the lattice surface;

retaining the formed sheet of fibers along the peripheral surface of the first forming member for a predetermined distance after movement past the meshing portions of the projections and recessed surfaces primarily by drawing air through said air passageways; and attaching a layer of material to the anchor portions of the sheet of fibers to form at least a portion of a backing attached to the spaced anchor portions fibers with the arcuate portions of the sheet of fibers projecting from a front surface of the backing.

24. A method for forming a sheet of loop material according to claim 23 further including the steps of:

heating the first forming member to a temperature substantially above ambient temperature; and supplying a source of heated air substantially above ambient temperature to be drawn into said air passageways during said retaining step.

25. A method for forming a sheet of loop material according to claim 23 wherein said attaching step includes thermal bonding of the backing to the anchor portions of the sheet of fibers.

* * * * *